United States Patent [19]

Conibear

[11] 4,117,623
[45] Oct. 3, 1978

[54] MODIFIED JAWS FOR ANIMAL TRAP

[75] Inventor: Frank R. Conibear, Victoria, Canada

[73] Assignee: Woodstream Corporation, Lititz, Pa.

[21] Appl. No.: 501,755

[22] Filed: Aug. 29, 1974

[51] Int. Cl.² .................................................. A01M 23/26
[52] U.S. Cl. ..................................................... 43/90
[58] Field of Search .................................. 43/88, 90, 92

[56] References Cited

U.S. PATENT DOCUMENTS

| 2,577,182 | 12/1951 | Clark | 43/90 |
| 3,010,245 | 11/1961 | Conibear | 43/90 |
| 3,816,955 | 6/1974 | Conibear | 43/90 |

OTHER PUBLICATIONS

Lunn; H. C.; *The Conibear Trap—Recommendations for its Improvement*, Aug., 1973.

Primary Examiner—Clifford D. Crowder
Attorney, Agent, or Firm—Holman & Stern

[57] ABSTRACT

An improved frame for a rotating frame animal trap, wherein, when the trap is viewed in closed position, an outer portion of at least one of the ends of the frame encircled by the actuator rings is so shaped, as it progresses radially outwardly from the axis of rotation of the frames, that it extends to a point out of the common plane of the jaws of the frame on the side thereof remote from the other frame, and thence returns to said plane wherein it connects with one end of a jaw. The point may be located at a distance from the axis of rotation about the same as or greater than the distance of said jaw from this axis. The actuator rings of the trap according to this construction are adapted to exert sufficient clamping force on the jaws of the trap to quickly kill a desired animal trapped therein. Where the point is located at a greater distance from the axis of rotation than is the jaw in question, then it is made more difficult for the actuator ring to slide over the corresponding corners of the frames of the trap onto the jaws thereof.

10 Claims, 8 Drawing Figures

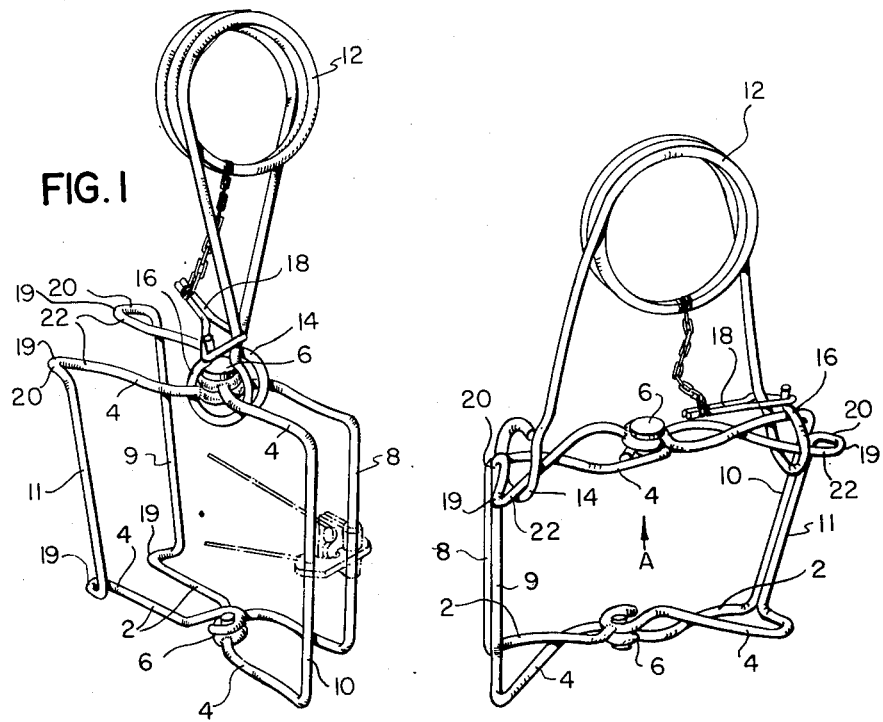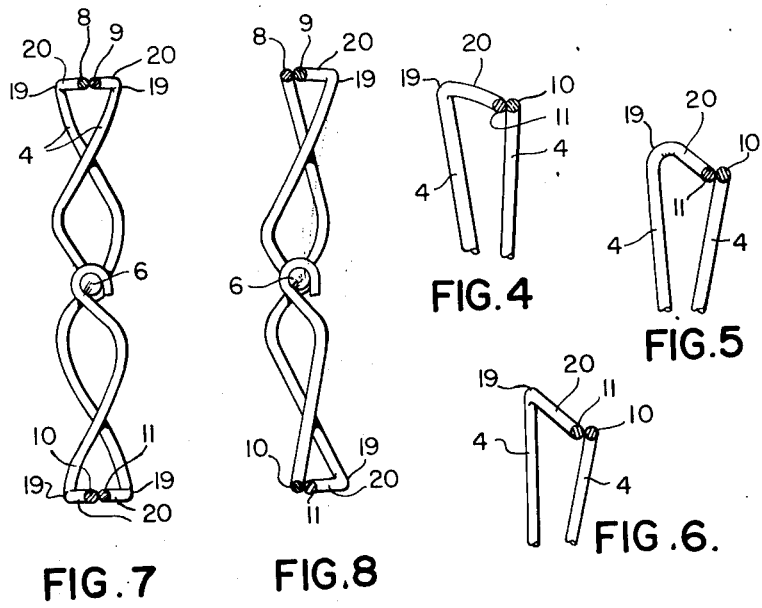

MODIFIED JAWS FOR ANIMAL TRAP

BACKGROUND OF THE INVENTION

This invention relates to improvements in a rotating frame animal trap. More particularly, the present invention relates to improvements in the frame design of the rotating frame type of trap. By a rotating frame animal trap is meant a trap which comprises a pair of similar frames pivotally connected at adjacent ends for relative rotation on a common axis so as to form by their sides two pairs of co-acting jaws. Heretofore these frames have been substantially square or rectangular in shape, as described in my U.S. Pat. No. 3,010,245, dated Nov. 28, 1961, or part-trapezoidal in shape as described in my U.S. Pat. No. 3,760,531, dated Sept. 25, 1973. At least one actuator, consisting of a coil spring having arms terminating in rings slidable along and encircling one set of adjacent ends of the frames, is used to urge the jaws toward and maintain them in closed position. In my U.S. Pat. No. 3,010,245, such a rotating frame trap is described in which the ends which cooperate with the rings are shaped so that in the set position of the trap, outer portions of these ends on each side of central portions lie substantially parallel to each other, while the central portions of these ends near the common axis of the frames form a cross with each other within the rings on the arms of the coil spring. In this version of trap, the jaw-forming sides of each of the frames lie in a common plane, and the outer portions of the ends extend directly to the jaws. A trigger and release mechanism (for example, as described in the earlier of my above-mentioned United States patents, in Lehn, U.S. Pat. No. 2,947,107, dated Aug. 2, 1960, my U.S. Pat. No. 3,762,094, dated Oct. 2, 1973, maintains the frames in open position when the trap is set, but when the trap is sprung, releases the frames so as to permit, as a result of the action of the actuator rings on the frame ends, rapid rotation of the frames through an angle of about 90 degrees, so that the jaws quickly strike and squeeze an animal in the trap to kill it.

This type of trap is at the present time the most widely available trap based on humane principals in use in North America. It has been favoured by many humane trapping groups because it constitutes a substantial improvement over such traps as the leg-hold trap. However, despite the present wide usage of the rotating frame trap and its humane effectiveness, there is a constant demand from humane trapping groups to improve the humane efficiency of the trap, i.e. to make it more effective so that it kills any desired animal passing through it and so that such animal, when caught by the trap, will be killed as quickly as possible. Depending upon the position of the animal when it is struck by the jaws of the trap which is closing, this trap may kill the animal instantly or quickly, or act simply as a body-holding trap, the length of time for the animal to be killed in this latter instance being indefinite.

One of the difficulties, particularly when larger sizes of such traps are used, or when the actuator rings are larger, is that the jaws of the trap may not be clamped tightly enough together when the trap is in closed position with the actuator rings in fully expanded position at the ends of their "runs" along adjacent frame ends. Unless an animal caught in such a trap is killed instantly by the impact of the jaws on its body, the trap may then act as a body-holding trap and consequently death may be extremely slow. It can be thus readily appreciated that any improvement in these traps which can increase the clamping force of or reduce the distance between co-acting jaws of the trap when in closed position will improve the humane effectiveness of the trap.

The trigger described in my co-pending U.S. Pat. application Ser. No. 479,082, filed June 13, 1974, now abandoned, is intended to increase the chances that an animal will be in a vulnerable position when it is struck by the jaws of the trap, to ensure that more such animals are killed instantly. Similarly, the actuator rings described in my co-pending U.S. Pat. application Ser. No. 498,239, filed Aug. 16, 1974, now U.S. Pat. No. 3,924,347, issued Dec. 9, 1975 act to increase the starting power of the trap as it begins to close on an animal, and to increase the squeezing power of the jaws of the closed trap on an animal caught therein. Both of these features thus constitute important advances in the direction of increasing the humane efficiency of these traps.

It is an object of the present invention to provide an improved frame for such a rotating frame animal trap, in which the jaw-forming sides of each frame lie in a common plane, which can be used with or without these aforementioned features to increase still further the humane efficiency of such traps. It is a further object of the invention to provide an economical improvement which can be made to the rotating frame animal trap which will kill more animals instantly or result in the animal's death or unconsciousness within a shorter period of time.

SUMMARY OF THE INVENTION

In order to achieve these and other objects, a rotating frame trap in which the jaw-forming sides of each frame lie in a common plane has been constructed so that an outer portion of at least one of the ends of a frame encircled by said rings, as it progresses radially outwardly from the axis of rotation of the frames, extends to a point out of the common plane of the frame on the side thereof remote from the other frame when viewed with the trap in closed position, and thence returns to said plane wherein it connects with one end of a jaw. In this way, when the actuator rings of a given actuator are in fully expanded position encircling and bearing against adjacent frame ends, the clamping force normally exerted by the jaws of the trap upon an animal caught therein will be increased, permitting a quicker and more humane death for the animal. In a given rotating frame trap, the distance out of the common plane of the point to which the outer portion of the frame end extends may be selected for most effective results depending upon the size and type of animal or animals sought to be trapped. Of course, this point must not be located so far out of the common plane of the jaws so that expansion of the actuator rings to fully expanded position bearing against inner portions of the jaws would be prevented or seriously hindered.

In a preferred embodiment of the frame according to the present invention, at least one of the outer portions of the adjacent frame ends encircled by said rings on each side of the common axis is constructed according to the invention. The shaped outer portions may be provided on one of the frames, so that a standard frame of a proper size can be used as the other frame for the trap.

The point to which the outer portion extends may be located at about the same distance from the axis of rotation of the frames as the end of the jaw to which it connects, or alternatively it may be located at a distance farther from said axis than is said end of the jaw. This latter construction assists in preventing the actuator rings from sliding over the corners of the frames onto the jaws of the trap.

Because of the greatly increased lethality provided by the increased clamping force exerted by the closed trap according to the present invention and in view of the consequently increased danger to a trapper handling it, it is recommended that the actuator used on such a trap has the open ring quick release feature described in my co-pending U.S. patent application Ser. No. 208,797, now U.S. Pat. No. 3,816,955, issued June 18, 1974. With some constructions according to the present invention, if it is desired to minimize the possibility of one of the actuator rings in expanded position on the closed trap frames sliding over corresponding corners onto the jaws of the trap, an actuator having the double ring feature described in my co-pending U.S. Pat. application Ser. No. 498,239 may be used. Such a double ring actuator however might be of no advantage where the points to which the outer portions extend are a greater distance from the axis of rotation than the ends of the jaws to which these ends are connected. In this case, the actuator rings, in their fully expanded position abutting against inner portions of the jaws of the trap, would normally be prevented from passing over this point, which these rings would have to do in order to slip over the corners of the frames onto the sides.

While both outer portions of each of the adjacent frame ends may be shaped according to the invention, it may be more economical to manufacture a trap having just one outer portion of either frame end on each side of the axis so constructed. Of course, in order to achieve the same degree of clamping force on the jaws of a given trap in this latter case, the distances out of the respective common planes of the points to which the outer portions extend would have to be twice as much as in the former case.

A trap constructed according to this invention permits the use of larger actuator rings, while a tight and powerful squeeze of the jaws of the closed trap is still achieved. Such larger rings give the jaws greater starting and striking power, enabling the trap to overcome snow, ice, leaves, twigs, etc., more easily when starting to close and, making the trap more effective against animals with bulky bodies. Thus, similar advantages to those obtained with the downwardly pointing, wedge-shaped base between the upper portions of the jaws of the frame when in closed position, described in my U.S. Pat. No. 3,760,531, can be obtained according to the present invention. However, the disadvantage with such wedge-shaped construction, in that a smaller animal caught in the trap with its backbone in the wedge-shaped opening may not be killed so quickly, is avoided with the construction according to the present invention.

BRIEF DESCRIPTION OF THE DRAWINGS

Other objects and advantages of the invention will become apparent upon reading the following detailed description and upon referring to the drawings in which:

FIGS. 1 and 2 are perspective views of one embodiment of an actuator and trap frame according to the present invention shown in open, set position and in closed position;

FIGS. 4, 5 and 6 are fragmentary views of a pair of jaws and outer portions of adjacent frame ends illustrating further embodiments of frames according to the present invention, taken in the direction of the arrow A shown in FIG. 2;

FIGS. 7 and 8 are sectional views of the closed jaws and a pair of adjacent frame ends of alternative embodiments of frames, again taken in the direction of the arrow A shown in FIG. 2.

Figure 3:
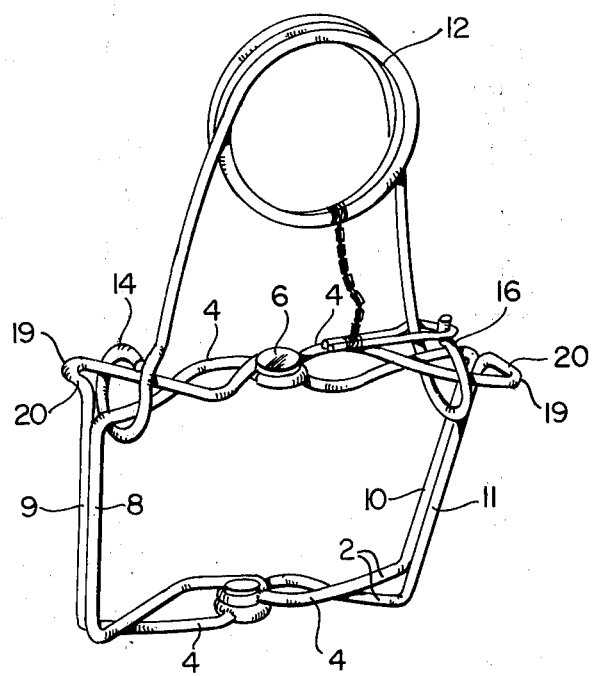
FIG. 3 is a perspective view of an actuator and trap frame showing a further embodiment of a frame according to the present invention.

While the invention will be described in connection with example embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning first to FIGS. 1 and 2, a rotating frame animal trap having similar frames 2 according to the invention is shown. These frames are pivotally connected at central portions of ends 4 for relative rotation about pivot 6 on a common axis, and form by their sides two pairs of co-acting jaws 8 and 9, and 10 and 11 respectively. Any suitable trigger and release mechanism, shown in phantom in FIG. 1, may be used. A "quick release" actuator 12 as described in my co-pending U.S. Pat. application Ser. No. 208,797, now U.S. Pat. No. 3,816,955, issued June 18, 1974 having closed ring 14 and open ring 16 urges the trap frames towards closed position. Keeper 18 is releasably fastened across the opening of ring 16 to prevent unpurposeful disengagement of that ring from its position encircling upper frame ends 4. The outer portions of the upper and lower frame ends 4 which support jaws 9 and 11 extend to points 19, which points are out of the common plane of jaws 9 and 10, and 11 and 12 respectively, on the sides thereof remote from the corresponding outer portions of the frame ends supporting jaws 8 and 10, when the trap is in closed position as shown in FIG. 2. Extremities 20 of these outer portions of the frame ends return to the respective planes, connecting with the corresponding ends of jaws 9 and 11. In the embodiment illustrated in FIGS. 1 and 2, points 19 are located at a greater distance from pivot 6 than jaws 9 and 11. The outer portions of the frame ends are shaped, and points 19 are located, so that, when the trap is in closed position, the actuator rings bearing against these outer portions of the frame ends will normally result in greater clamping force being exerted by the jaws of the trap on a desired animal caught therein. Additionally, the slight inward bends 22, shown in FIG. 2 (which bends appear as outward bends in the open position of the trap as illustrated in FIG. 1) of outer portions of the frame ends about which the actuator rings bear when in final stages of closing, permit these frame ends to offer less resistance to the actuator rings as they close over them, thereby providing the trap with greater impact strength. These inward bends of the frame ends may be necessary in many constructions of the trap according to the present invention, since the ends of adjacent frame ends encircled by the actuator rings might otherwise be spaced too far apart in closed position to permit the actuator rings to expand fully.

The outer portions of the frame ends which are constructed according to the present invention should be shaped so that, when the trap is in closed position with the actuator rings fully expanded along upper frame ends 4, there is little or no "play" between pairs of co-acting jaws, and the actuator rings bearing against outer portions of adjacent frame ends 4 ensure that considerable bias or clamping force is exerted by the co-acting jaws in this position on a trapped animal.

Traps provided with frame ends according to the present invention permit a very tight and powerful squeeze in the jaws of the closed trap even when larger actuator rings are used. As well, in view of the greater distance from pivot 6 of points 19 than jaws 9 and 11, such larger actuator rings are prevented from slipping over the corresponding corners of the frames onto the jaws of the trap when in fully expanded position.

The embodiment illustrated in FIG. 3 differs from that shown in FIGS. 1 and 2 in two main respects: firstly, the outer portions of the frame ends shaped according to the invention are found only on upper frame ends 4, and secondly, these shaped outer portions are found only on one of the two rotating frames 2. The embodiment of FIGS. 1 and 2 is capable of operating with two actuators, the second one having its rings operating along lower frame ends 4. The embodiment illustrated in FIG. 3, however, is designed to operate only with one actuator, its rings 16 and 14 operating along upper frame ends 4. By having the shaped outer portions of frame ends 4 on only one frame as in the embodiment of FIG. 3, the distance of "neutral space" lying between adjacent pairs of jaws 8 and 10 and 9 and 11, when the frame is in open, set position (not illustrated) will be understood to be approximately the same. In the embodiment illustrated in FIGS. 1 and 2, where the shaped outer portions of frame ends 4 are located on each frame, and only one of the outer portions of the adjacent frame ends on each side of the axis when the trap is viewed in closed position, is so shaped, it can be seen that the distance between jaws 9 and 11 is much greater than that between jaws 8 and 10 in open, set position (FIG. 1). One or the other construction may be better suited for a particular type of release mechanism and trigger, or for a particular type of frame mounting device.

In the embodiments illustrated in FIGS. 4, 5 and 6, alternative constructions of shaped outer portions of frame ends are illustrated. In each of these embodiments, point 19 is a greater distance than jaw 11 from the axis of rotation. Again, this feature assists in preventing the actuator rings from slipping over the corners of the frames onto the jaws of the trap.

As shown in FIGS. 7 and 8, the outer portions of frame ends can be constructed in a manner in which, unlike in the preceding embodiments, points 20 are about the same distance as the respective jaws from pivot 6. For a given trap, the length of extremities 20 of the shaped outer portions of the frame ends, between points 19 and the ends of the corresponding jaws, need be only half as great to achieve the same results when outer end portions of both adjacent frame ends on each side of pivot 6 are shaped, as shown in FIG. 7, than when only one of them is so shaped as shown in FIG. 8.

It is apparent that there has been provided, in accordance with the invention, an improved frame construction for a rotating frame animal trap that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention is:

1. In an animal trap of the type having two similar frames, each having jaw forming sides which lie in a common plane and ends extending therebetween to support said jaws, said ends each having a central portion in which the frames are pivotally connected through adjacent ends for rotation about a common axis between set and closed positions and outer portions on each side of the central portion extending to said jaws, a trigger means for releasably maintaining the trap in set position and at least one actuator, capable of rapidly and forcefully effecting such rotation, which has two arms spring-biased at one end so that the other ends, which terminate in rings encircling adjacent ends of both frames on opposite sides of said axis, would, if unobstructed, move apart to a distance substantially greater than the length of said frame ends, the improvement wherein an outer portion of at least one of said ends of a frame encircled by said rings is so shaped, as it progresses radially outwardly from said axis, that it extends to a point out of the common plane of said jaws on the side thereof remote from the other frame when viewed with the trap in closed position, and thence returns to said plane wherein it connects with one end of a jaw, said point being located at a distance from said common axis that is about the same as the distance from said axis to said one end of a jaw.

2. In an animal trap comprising two similar frames, each having opposite side portions and connecting end portions, pivot means pivotally connecting the end portions of said frames together intermediate said side portions, spring means for swinging said frames relative to one another about their pivots from a set position in which an upper side portion of one frame is adjacent an upper side portion of the other frame to a closed position in which said upper side portion of each frame is adjacent a lower side portion of the other frame, latch means for holding said frames in the set position, and trigger means for releasing said latch means when contacted by an animal to thereby enable said frames to swing to the closed position, the improvement comprising said spring including at least one spring member having a central spiral portion and normally diverging arm portions each of which terminates in eye members encircling end portions of both said frames adjacent their connection to their respective side portions of said frames in said closed position and pressing against said end portions, bent portions defining an angle of about 90° at each end of said connecting end portions of said one frame in such a direction that said upper side portion and said lower side portion of said one frame are bent toward said lower side portion and said upper side portion, respectively, of said other frame when in said closed position and bent away from said upper side portion and said lower side portion, respectively, of said other frame when in said set position, said bent portions being of sufficient dimensions to preclude passage of said eye members thereover and to thereby prevent said eye members from encircling said side portions of said frames.

3. In an animal trap of the type having two similar frames, each having jaw-forming sides which lie in a common plane and ends extending therebetween to support said jaws, said ends each having a central portion in which the frames are pivotally connected through adjacent ends for rotation about a common axis between set and closed positions and outer portions on each side of the central portion extending to said jaws, a trigger means for releasably maintaining the trap in set position and at least one actuator, capable of rapidly and forcefully effecting such rotation, which has two arms spring-biased at one end so that the other ends, which terminate in rings encircling adjacent ends of both frames on opposite sides of said axis, would, if unobstructed, move apart to a distance substantially greater than the length of said frame ends, the improvement wherein an outer portion of at least one of said ends of a frame encircled by said rings is so shaped, as it progresses radially outwardly from said axis, that it extends to a point out of the common plane of said jaws on the side thereof remote from the other frame when viewed with the trap in closed position, and thence returns to said plane wherein it connects with one end of a jaw, said point being located at a distance from said common axis that is about the same as or greater than the distance from said axis to said one end of a jaw.

4. An animal trap according to claim 3 wherein at least one of the outer portions of the adjacent frame ends encircled by said rings on each side of the common axis is so shaped.

5. An animal trap according to claim 3 wherein the sides of the frames are straight.

6. An animal trap according to claim 4 wherein said shaped outer portions on each side of the common axis are on one frame.

7. An animal trap according to claim 4 wherein said shaped outer portions on each side of the common axis are on both frames.

8. An animal trap according to claim 7 wherein each of the outer portions of said adjacent ends encircled by said rings is so shaped.

9. An animal trap according to claim 3 wherein at least one of the outer portions of the adjacent frame ends on each side of the common axis is so shaped, whereby the actuator rings are prevented from sliding over the corners of the frames onto the jaws of the trap.

10. An animal trap according to claim 3 wherein the sides of the frames are straight.

* * * * *